US008528102B2

(12) United States Patent
Chen et al.

(10) Patent No.: US 8,528,102 B2
(45) Date of Patent: Sep. 3, 2013

(54) METHOD AND SYSTEM FOR PROTECTION OF CUSTOMER SECRETS IN A SECURE REPROGRAMMABLE SYSTEM

(75) Inventors: Xuemin Chen, San Diego, CA (US); Iue Shuenn Chen, San Diego, CA (US); Stephane Rodgers, San Diego, CA (US); Andrew Dellow, Minchinhampton (GB)

(73) Assignee: Broadcom Corporation, Irvine, CA (US)

( * ) Notice: Subject to any disclaimer, the term of this patent is extended or adjusted under 35 U.S.C. 154(b) by 916 days.

(21) Appl. No.: 11/753,414

(22) Filed: May 24, 2007

(65) Prior Publication Data

US 2008/0086780 A1   Apr. 10, 2008

Related U.S. Application Data

(60) Provisional application No. 60/828,580, filed on Oct. 6, 2006.

(51) Int. Cl.
*G06F 7/04* (2006.01)

(52) U.S. Cl.
USPC ............... 726/27; 726/25; 726/26; 726/22; 713/193; 713/151; 713/156; 713/170; 714/726; 714/176

(58) Field of Classification Search
USPC .............................. 726/1–2, 15–27; 713/193
See application file for complete search history.

(56) References Cited

U.S. PATENT DOCUMENTS

| | | | | |
|---|---|---|---|---|
| 5,421,006 A * | 5/1995 | Jablon et al. | ............... | 714/36 |
| 6,581,162 B1 * | 6/2003 | Angelo et al. | ............... | 713/193 |
| 6,625,749 B1 * | 9/2003 | Quach | ............... | 714/10 |
| 6,922,846 B2 * | 7/2005 | Kessler et al. | ............... | 725/151 |
| 6,928,548 B1 * | 8/2005 | Hale et al. | ............... | 713/187 |
| 6,968,453 B2 * | 11/2005 | Doyle et al. | ............... | 713/168 |
| 7,062,623 B2 * | 6/2006 | Vogt et al. | ............... | 711/164 |
| 7,065,654 B1 * | 6/2006 | Gulick et al. | ............... | 713/193 |
| 7,069,452 B1 * | 6/2006 | Hind et al. | ............... | 713/1 |
| 7,117,534 B2 * | 10/2006 | Candelore | ............... | 726/26 |
| 7,146,329 B2 * | 12/2006 | Conkwright et al. | ...... | 705/14.66 |
| 7,185,249 B2 * | 2/2007 | Tkacik et al. | ............... | 714/726 |
| 7,194,756 B2 * | 3/2007 | Addington et al. | ........... | 725/116 |
| 7,353,403 B2 * | 4/2008 | Kim | ............... | 713/193 |

(Continued)

OTHER PUBLICATIONS

Katzir L, Secure Firmware updates for smart grid devices, IEEE, Dec. 2011, vol. 7, pp. 1-5.*

*Primary Examiner* — Nathan Flynn
*Assistant Examiner* — Viral Lakhia
(74) *Attorney, Agent, or Firm* — Sterne, Kessler, Goldstein & Fox P.L.L.C.

(57) ABSTRACT

Methods and systems for protection of customer secrets in a secure reprogrammable system are disclosed, and may include controlling, via hardware logic and firmware, access to customer specific functions. The firmware may comprise trusted code, and may comprise boot code, stored in non-volatile memory, which may comprise read only memory, or a locked flash memory. A customer mode may be checked via the trusted code prior to allowing downloading of code written by a customer to the reprogrammable system. Access to customer specific functions may be restricted via commands from a trusted source. The hardware logic may be latched at startup in a disabled mode by the firmware, determined by the customer mode stored in a one time programmable memory. The customer mode may be re-checked utilizing the firmware, and may disallow the use of code other than trusted code in the reprogrammable system when the re-checking fails.

33 Claims, 6 Drawing Sheets

(56) References Cited

U.S. PATENT DOCUMENTS

| | | | |
|---|---|---|---|
| 7,386,128 B2 * | 6/2008 | Moroney | 380/210 |
| 7,389,273 B2 * | 6/2008 | Irwin et al. | 705/59 |
| 7,398,554 B1 * | 7/2008 | Falik et al. | 726/23 |
| 7,530,108 B1 * | 5/2009 | Cocchi et al. | 726/26 |
| 7,530,112 B2 * | 5/2009 | Smith | 726/28 |
| 7,716,662 B2 * | 5/2010 | Seiden | 717/173 |
| 7,844,996 B2 * | 11/2010 | Chen et al. | 726/1 |
| 7,913,289 B2 * | 3/2011 | Chen et al. | 726/1 |
| 7,987,356 B2 * | 7/2011 | Buer | 713/155 |
| 2002/0095601 A1 * | 7/2002 | Hind et al. | 713/201 |
| 2005/0071280 A1 * | 3/2005 | Irwin et al. | 705/59 |
| 2005/0097378 A1 * | 5/2005 | Hwang | 713/320 |
| 2006/0117177 A1 * | 6/2006 | Buer | 713/155 |
| 2006/0149972 A1 * | 7/2006 | Deng et al. | 713/193 |
| 2006/0282638 A1 * | 12/2006 | Oshima et al. | 711/170 |
| 2007/0050294 A1 * | 3/2007 | Trottier et al. | 705/50 |

\* cited by examiner imageMETHOD AND SYSTEM FOR PROTECTION OF CUSTOMER SECRETS IN A SECURE REPROGRAMMABLE SYSTEM

CROSS-REFERENCE TO RELATED APPLICATIONS/INCORPORATION BY REFERENCE

This application makes reference to, claims priority to, and claims the benefit of U.S. Provisional Application Ser. No. 60/828,580 filed on Oct. 6, 2006.

This application also makes reference to:
U.S. patent application Ser. No. 11/753,338 filed on May 24, 2007; and
U.S. patent application Ser. No. 11/753,474 filed on May 24, 2007.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to software security. More specifically, certain embodiments of the invention relate to a method and system for protection of customer secrets in a secure reprogrammable system.

BACKGROUND OF THE INVENTION

A typical set-top box is a device that processes analog and/or digital information bearing media content. Set-top boxes (STB) may act as a gateway between a television or PC and a telephone, satellite, terrestrial or cable feed (incoming/outgoing signal.) The STB may receive encoded and/or compressed digital signals from the signal source such as satellite, TV station, cable network, a telephone company, for example, and decodes and/or decompresses those signals, converting them into analog signals displayable on a television. The STB accepts commands from the user (often via use of handheld remote control, keypad, voice recognition unit or keyboard) and transmits these commands back to the network operator.

The implementation of fee-based video broadcasting requires a conventional conditional access (CA) system to prevent non-subscribers and unauthorized users from receiving signal broadcasts. Cryptography algorithms may be utilized, for example, in content protection in digital set-top box systems and in other systems utilized in fee-based video broadcasting. Security keys may, therefore, play a significant part in the encryption and/or decryption process initiated by a cryptography algorithm. For each cryptography algorithm used in a fee-based video broadcasting system, there may be a set of associated security keys that may be needed by the algorithm.

In an increasingly security conscious world, protecting access to information and/or to systems from unwanted discovery and/or corruption is a major issue for both consumers and businesses. Many consumer or business systems may be vulnerable to unwanted access when the level of security provided within the system is not sufficient for providing the appropriate protection. In this regard, consumer systems, such as multimedia systems, for example, may require the use of integrated architectures that enable security management mechanisms for defining and administering user rights or privileges in order to provide the necessary protection from unwanted access. An example of a multimedia system that may be accessed by many different users may be a set-top box where manufacturers, vendors, operators, and/or home users may have an interest in accessing or restricting at least some limited functionality of the system.

The firmware of the security processor used to control the set-top box security functions may require occasional updating. This can pose a security problem in instances where multiple customers utilize the set-top box in their applications but with customer-specific functions and code.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for protection of customer secrets in a secure reprogrammable system, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for protection of customer secrets in a secure reprogrammable system. Exemplary aspects of the invention include controlling, via hardware logic and firmware, access to customer specific functions. The firmware may comprise trusted code, and may comprise boot code, stored in non-volatile memory, which may comprise read only memory, or a locked flash memory. A customer mode may be checked via the trusted code prior to allowing downloading of code written by a customer to the reprogrammable system. Access to customer specific functions may be restricted via commands from a trusted source. The hardware logic may be latched at startup in a disabled mode by the firmware, determined by the customer mode stored in a one time programmable memory. The customer mode may be re-checked utilizing the firmware, and may disallow the use of code other than trusted code in the reprogrammable system when the re-checking fails.

Figure 1A:
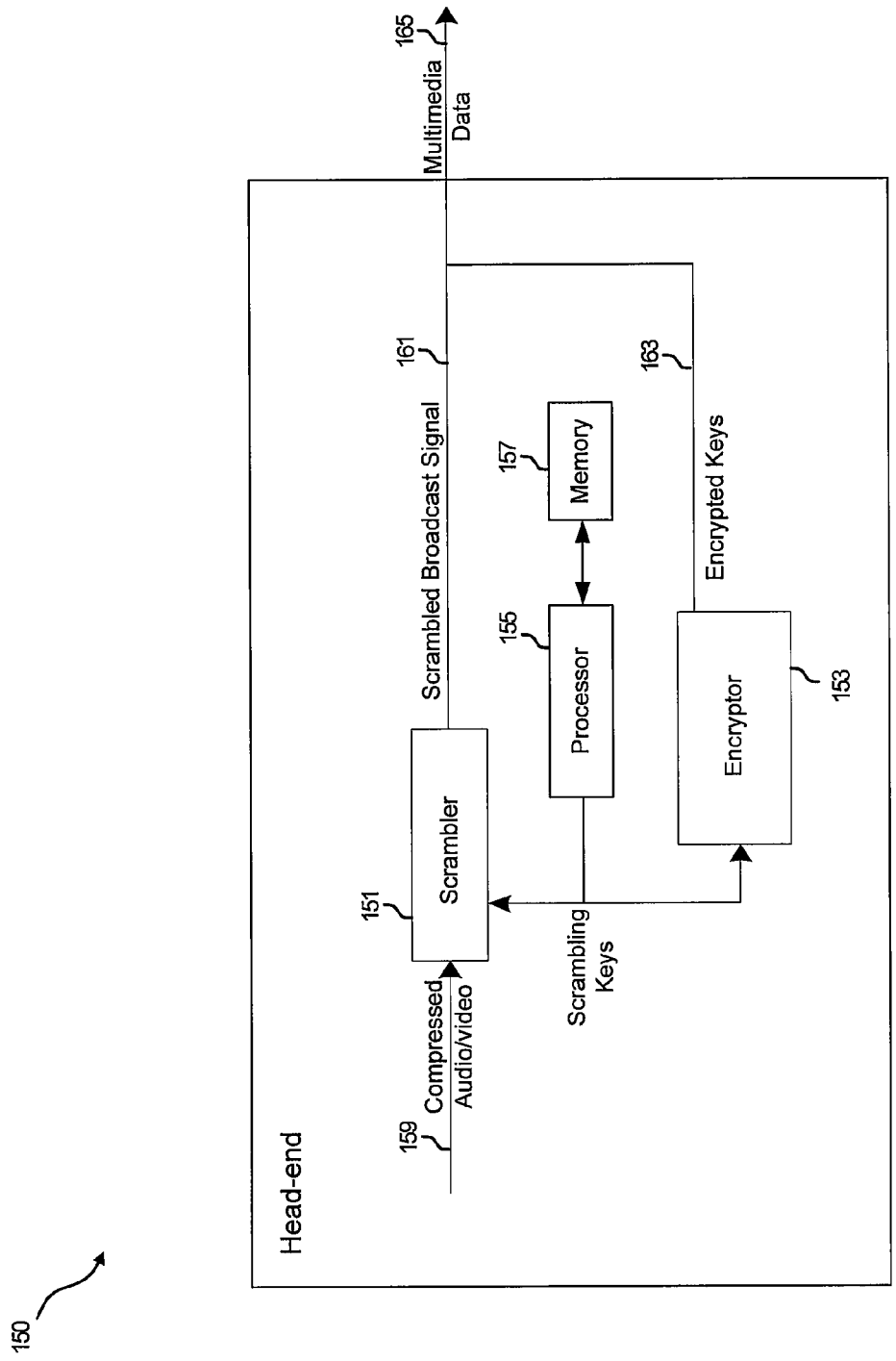
FIG. 1A is a block diagram illustrating an exemplary head-end system, in accordance with an embodiment of the invention.

FIG. 1A is a block diagram illustrating an exemplary head-end system, in accordance with an embodiment of the invention. Referring to FIG. 1, there is shown a block diagram of an exemplary head-end 150 comprising a scrambler 151, an encryptor 153, a processor 155 and a memory 157.

The memory 157 may comprise suitable circuitry, logic and/or code that may be enabled to store data that may be utilized by the processor 155 to control the scrambler 151 and the encryptor 153. The data stored on the memory 157 may be utilized by the processor 155 to generate scrambling keys for the scrambler 151 and the encryptor 153.

The scrambler 151 may comprise suitable circuitry, logic and/or code that may be enabled to scramble compressed audio/video 159 utilizing scrambling keys generated by the processor 155 to generate the scrambled broadcast signal 161. The scrambling keys may be unique to a specific end user, or set-top box, and may be changed periodically to increase security.

The encryptor 153 may comprise suitable circuitry, logic and/or code that may be enabled to encrypt the scrambling keys to generate the encrypted keys 163. The encrypted keys 163 and the scrambled broadcast signal 161 may comprise the multimedia data 165 communicated to a end user, or set-top box.

The processor 155 may comprise suitable circuitry, logic and/or code that may be enabled to generate scrambling keys that may be utilized by the scrambler 151 and the encryptor 153 to generate a scrambled multimedia signal 165.

In operation, during signal scrambling in the head-end 150, the scrambling keys may determine the scrambling pattern and may be communicated to the scrambler 151 and the encryptor 153 by the processor 155. The scrambler 151 may copy protect scramble or conditional access scramble the compressed audio/video 159. The scrambling key may be changed at fixed intervals of time, such as every few seconds, to maintain a secure system. The scrambling keys may, therefore, be continuously transmitted to the subscriber's receiver, or set-top box 103, as described with respect to FIG. 1B. This may be achieved in the head-end 150 by encrypting the scrambling keys utilizing the encryptor 153 and transmitting it within the scrambled keys 163. The scrambling keys may be unique to a specific set-top box, for enhanced security.

In instances where the head-end may be utilized to upload software code to a receiver, such as a set-top box, for example, the processor 155 may communicate the software code to the scrambler 151. The software code may be scrambled by the scrambler 151, which may enhance the security of the downloaded software code. In addition, the communicated software code may include a signature that may be used by the set-top box to verify the received software, and is described further with respect to FIG. 1B.

Figure 1B:
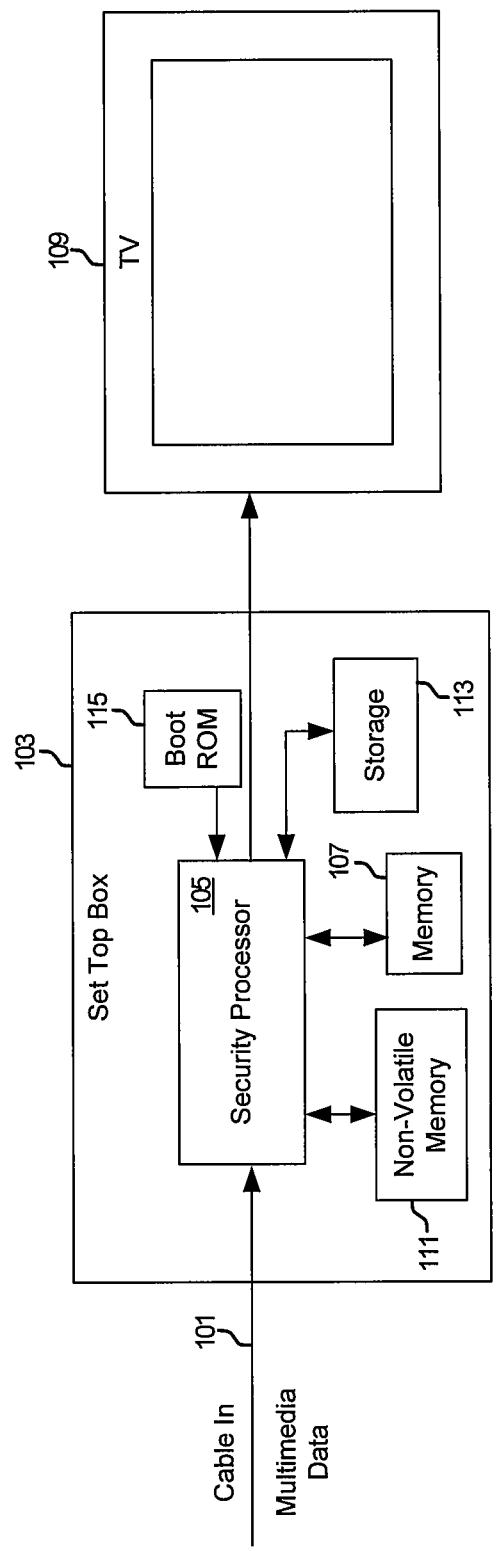
FIG. 1B is a block diagram illustrating an exemplary set-top box with a security processor, in accordance with an embodiment of the invention.

FIG. 1B is a block diagram illustrating an exemplary set-top box with a security processor, in accordance with an embodiment of the invention. Referring to FIG. 1B, there is shown a cable input 101, a television 109 and a set-top box 103 comprising a security processor 105, a memory 107, a boot ROM 115, a non-volatile memory (NVM) 111 and a storage 113.

The cable input 101 may communicate scrambled MPEG-2 multimedia signals, which may be generated by a headend or service provider, and may comprise audio, video, data and/or voice, for example. Although a cable input 101 is shown, the invention is not so limited. Accordingly, other media inputs such as, for example, a satellite feed or a wireless network connection may be provided as an input to the set-top box 103.

The set-top box 103 may comprise suitable circuitry, logic and/or code for receiving multimedia input signals and generating an output signal that may be displayed on the television 109 and/or stored in the storage 113.

The memory 107 may comprise suitable circuitry, logic and/or code that may be enabled to store code for execution by the security processor 105. The memory 107 may comprise read-only memory (ROM) and/or random access memory (RAM).

The NVM 111 may comprise suitable circuitry, logic and/or code that may be enabled to store code for controlling operation of the set-top box 103. The code stored in NVM 111 may be loaded by the security processor 105 and written to the memory 107 for execution by the security processor 105. In this manner, the speed of execution may be faster since the memory 107 may be faster than the NVM 111.

The security processor 105 may comprise suitable circuitry, logic and/or code that may be enabled to receive a scrambled transport stream from, for example, the cable input 101 and descrambling the transport stream for decoding and/or display. The security processor 105 may be enabled to re-scramble the descrambled data for copy protection (CP) prior to storing on the storage 107.

The storage 113 may comprise suitable circuitry, logic and/or code that may be enabled to store multimedia data received by the set-top box 103. The storage 103 may comprise a hard drive or other storage device capable of storing large amounts of multimedia data, for example.

The boot ROM 115 may comprise suitable circuitry, logic and/or code that may be enabled to communicate data to the security processor 105. The boot ROM 115 may store data comprising boot code, customer and/or user-specific algorithms and/or code, for example, to be utilized by the security processor 105. The boot code stored on the boot ROM 115 may comprise operating instructions for the security processor 105 during reboot and/or startup.

In operation, a multimedia transport stream may be communicated to the set-top box 103 via the cable input 101. In instances where the multimedia transport stream may be scrambled for conditional access and/or copy protection, for example, the security processor 105 may descramble the transport stream before communicating a signal to the television 109 and may CP scramble the descrambled data before storing the data from the descrambled multimedia transport stream in the storage 113. The descrambling keys may be obtained by the set-top box 103 from a separate PID channel in the transport stream, via an entitlement control message (ECM). Following descrambling, the security processor 105 may re-scramble the data before storing the data from the descrambled multimedia transport stream in the storage 107.

The set-top box 103 may comprise various exemplary functions such as a scrambling/descrambling function, an entitlement control function, and an entitlement management function. The scrambling/descrambling function may be designed to make the program incomprehensible to unauthorized receivers. Scrambling may be applied commonly or separately to the different elementary stream components of a program. For example, the video, audio and data stream components of a TV program may be scrambled in order to make these streams unintelligible. Scrambling may be achieved by applying various scrambling algorithms to the stream components. The scrambling algorithm usually utilizes a descrambling key. Once the signal is received, the descrambling may be achieved by any receiver that holds the descrambling key, used by the scrambling algorithm prior to transmission. Scrambling and descrambling operations, in general, may not cause any impairment in the quality of the signals. The descrambling key used by the scrambling algorithm is a secret parameter known only by the scrambler and the authorized descrambler or descramblers. In order to preserve the integrity of the encryption process, the control word may be changed frequently in order to avoid any exhaustive searches by an unauthorized user, which may be intended to discover the descrambling key.

The set-top box 103 may be enabled to scramble and/or randomize transmitted data bits so that unauthorized decoders may not decode the transmitted data bits. In addition to scrambling, a key may also be transformed into an encrypted key in order to protect it from any unauthorized users. In various embodiments of the invention, the CA system descrambling/scrambling system 100 may be enabled to utilize key encryption, and the encrypted keys may be securely distributed.

The set-top box 103 may be enabled to provide protection against signal piracy, efficient scrambling, flexibility, support for a variety of formats, and ease of implementation.

For CA or CP, private (secure) keys may be used for scrambling and descrambling high-value content or for protecting highly sensitive transactions. In a CA system, the content scrambling key may be protected. To ensure proper functionality, the CA system may perform scrambling according to the properties of the data for transmission. In addition, the CA system may be enabled to change the key regularly to maintain the security of the scrambling system, and transmit the key information to the receiver in a secure manner using, for example, a hierarchical encryption system.

The software code utilized to control the operation of the set-top box 103 may be utilized by multiple customers, or users. Each customer may have different algorithms, features or functions, some of which may be proprietary, that may be enabled in the set-top box 103, and customers may not wish other customers to have access to these functions. For this reason, it may be desired to have restricted access to certain functions, which may be stored locally in a non-volatile memory or ROM. Conventional systems may download codesets which contain algorithms from multiple customers, with only software jumps or if-else constructs to prevent execution of one customer's code in another customer's box. Such software constructs are subject to glitch attacks, or software errors (bugs) which may inadvertently allow execution from unauthorized code. In addition, in a system which allows customer written code to be utilized on the security processor, said customer written code may overwrite the settings previously configured, thereby gaining access to secrets from other competitors (who may also be customers for the given set top box).

In accordance with an embodiment of the invention, the aforementioned issues may be mitigated by utilizing a boot ROM to store a customer mode which may indicate which proprietary algorithms and functions may be enabled in the set top box 103. In another embodiment of the invention, a non-volatile memory, such as a one-time programmable memory may be utilized to store customer mode and proprietary algorithms and functions. The implementation may comprise firmware and hardware, as opposed to software, greatly increasing system security. These embodiments are described further with respect to FIG. 2 and FIG. 3.

Figure 1C:
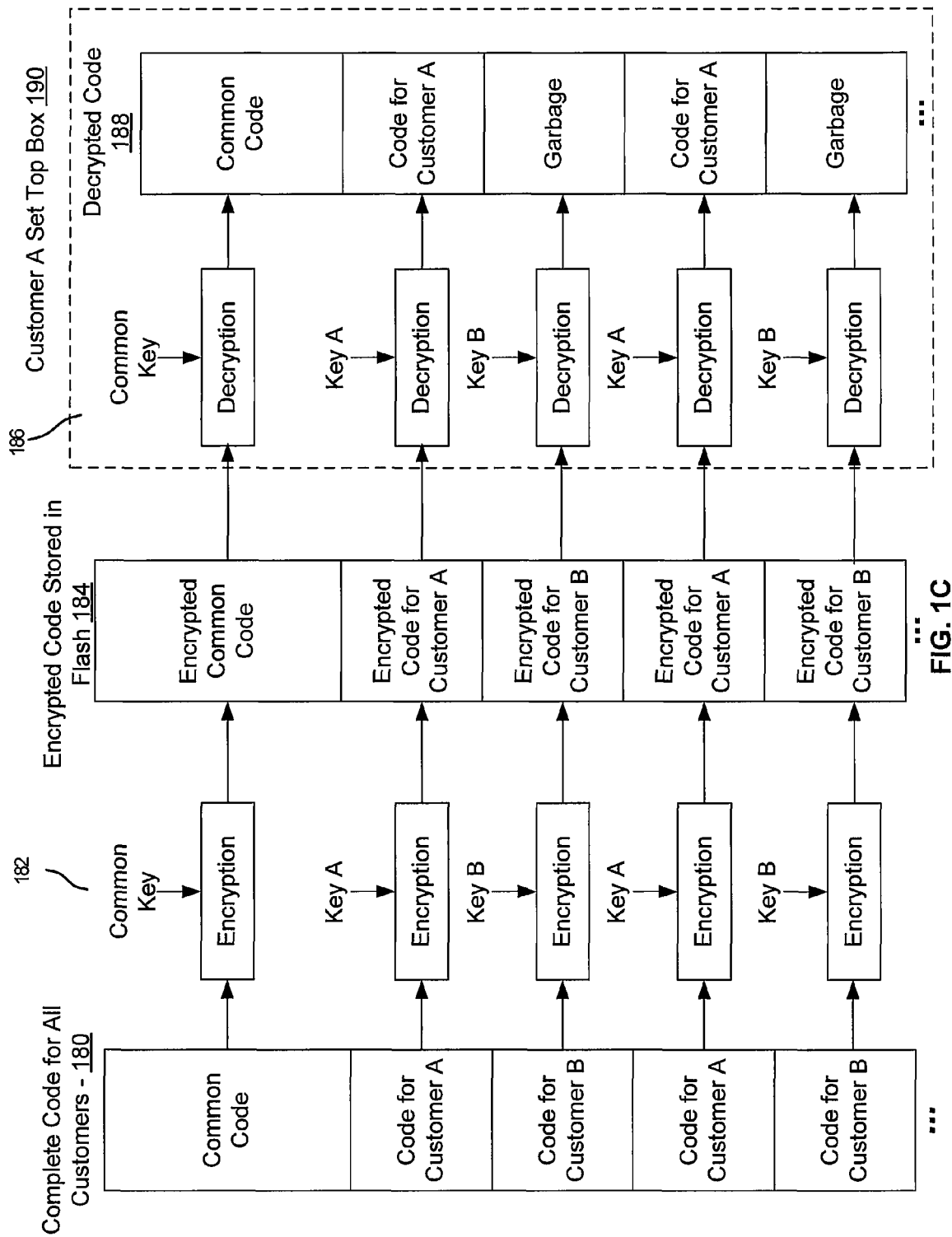
FIG. 1C is a block diagram of an exemplary customer-specific encryption process, in accordance with an embodiment of the invention.

FIG. 1C is a block diagram of an exemplary customer-specific encryption process, in accordance with an embodiment of the invention. Referring to FIG. 1C, there is shown an exemplary encryption and decryption process comprising a first column of blocks representing the complete code for all customers 180, a second column representing encryption blocks and associated keys 182, a third column of encrypted code stored in a flash memory 184, a fourth column representing decryption blocks and associated keys 186 and the fifth column represents the enabled and disabled code 188. The fourth and fifth columns may represent components within a customer A set top box 190.

In operation, the code in the security processor, such as the security processor 105 described with respect to FIG. 1B, comprises code for all customers, but each customer may only execute common code and its own code, as defined by a customer mode, and as such, each customer may only see its own code. Any attempt to jump into code of another customer may result in a failure. Common code, and code specific to customers A and B are illustrated in the first column, complete code for all customers. The number of customer code sections is not limited to the number shown in FIG. 1C. Accordingly any number of customer code sections may be utilized.

Each customer may be assigned a customer-specific key, which may be utilized to encrypt each customer's specific code, and a common key may be utilized to encrypt common code, as illustrated in the second column, encryption blocks and associated keys 182. The encryption of the code may result in the third column, encrypted code stored in a flash memory 184, with each block representing encrypted code which may comprise common code, code for customer A and code for customer B. The encrypted code may be communicated to the customer A set top box 190, where the common key and key A may be utilized to decrypt the received code, illustrated in the fourth column, decryption blocks and associated keys 186. Since the customer A set top box 190 may not have access to key B, it may not be able to decrypt code for customer B, and results in unencrypted code, indicated as garbage in FIG. 1C, fifth column, enabled and disabled code 188. Since the customer A set top box 190 may have access to the key A, code for customer A may be decrypted and result in the enabled executable code in column 5, enabled and disabled code 188.

Figure 2:
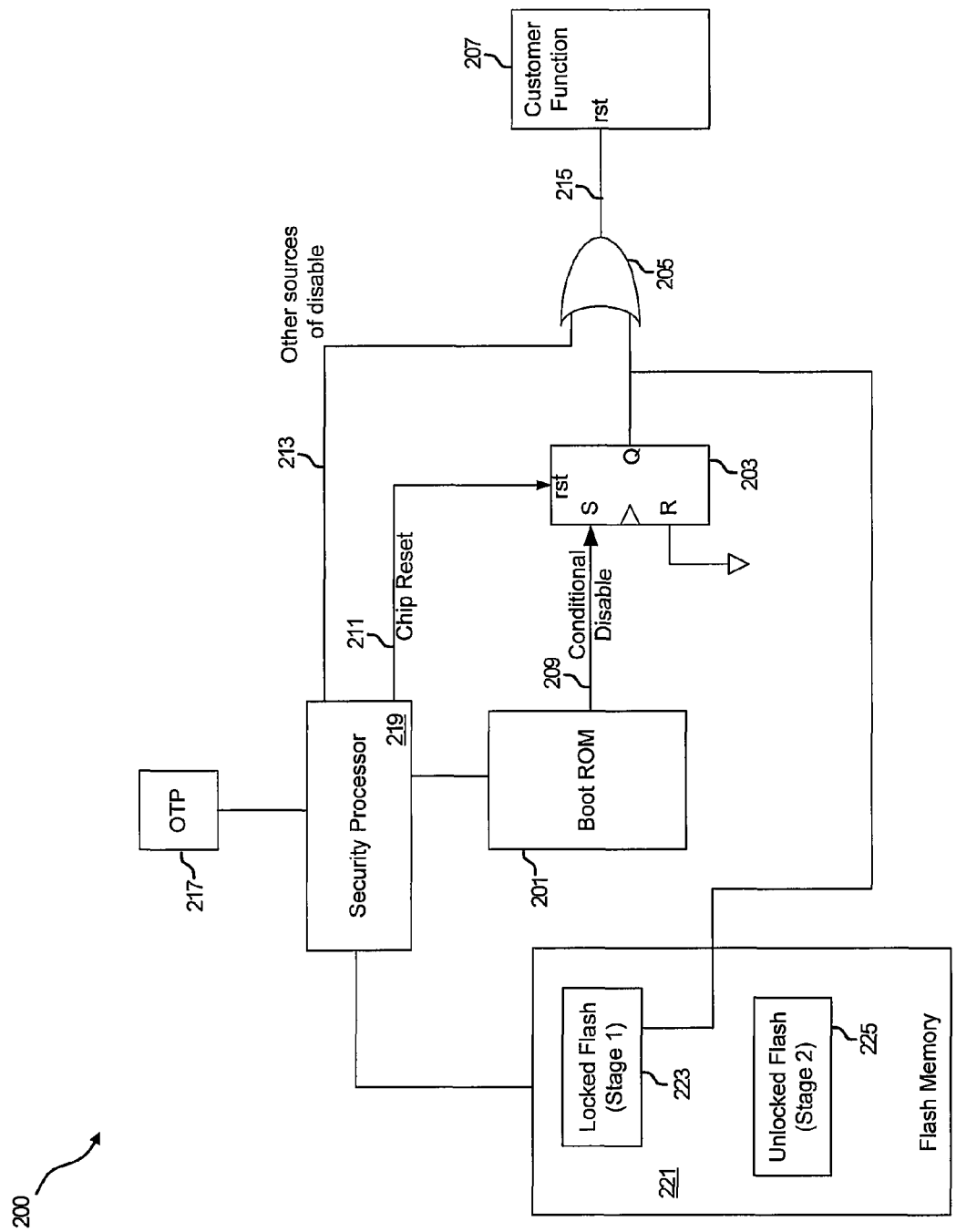
FIG. 2 is a block diagram illustrating an exemplary secure customer mode implementation utilizing boot ROM in a reprogrammable system, in accordance with an embodiment of the invention.

FIG. 2 is a block diagram illustrating an exemplary secure customer mode implementation utilizing boot ROM in a reprogrammable system, in accordance with an embodiment of the invention. Referring to FIG. 2, there is shown secure mode customer implementation 200 comprising a boot ROM 201, a flip-flop 203, an OR gate 205, a one time programmable (OTP) memory 217, a security processor 219, a flash memory 221 and a customer function block 207. There is also shown a conditional disable signal 209, a chip reset signal 211, an other sources of disable signal 213, and function disable signal 215. The security processor 219 may be substantially similar to the security processor 105 described with respect to FIG. 1B.

The boot ROM 201 may comprise suitable circuitry, logic and/or code that may be enabled to communicate a conditional disable signal 209 to the flip-flop 203. The boot ROM 201 may also store data that may comprise boot code, customer-specific algorithms and/or code for the security processor 219. The boot code stored on the boot ROM 201 may comprise operating instructions for the security processor 219 during reboot and/or startup.

The flip-flop 203 may comprise suitable circuitry, logic and/or code that may be enabled to latch an output signal as enabled or disabled. The flip-flop 203 may comprise a simple set-reset (SR) flip-flop where the output Q may be determined by the inputs, S and R. Since the R input is coupled to ground, indicating a permanent low, or binary 0, signal, the flip-flop 203 may include two states. In instances where the S input may be low, the output Q may "keep state" in that the output is latched at the state it was in prior to the input S being set to 0. In instances where the input S is set high, the output Q may be set to 1. In this manner, once the flip-flop 203 may be set to generate an output Q of 1, it may not switch back to 0 unless a chip reset, rst, may be enabled.

The OR gate 205 may comprise suitable circuitry, logic and/or code that may be enabled to generate an output signal based on the status of two inputs. If either input or both inputs are enabled high, or binary 1, the output may also be 1. If neither input may be high, the output may be low. The inputs to the OR gate 205 may comprise the output Q of the flip-flop 203 and the other sources of disable signal 213.

The customer function block 207 may comprise suitable circuitry, logic and/or code that may be enabled to perform functions determined by the customer mode. The functions may comprise algorithms, hardware operations and/or subroutines performed in the operation of a set-top box, such as the set-top box 103, described with respect to FIG. 1B.

The OTP memory 217 may comprise suitable circuitry, logic and/or code that may be enabled to store data. Bits in the OTP 217 may be programmed once and then may not be subsequently reprogrammed. Data stored in the OTP memory 217 may comprise customer mode or functions to be enabled, for example.

The flash memory 221 may comprise suitable circuitry, logic and/or code that may be enabled to store code that may be utilized by the security processor 219 to control the operation of the set-top box 103, described with respect to FIG. 1B.

The flash memory 221 may comprise a locked flash 223 and an unlocked flash 225. The locked flash 223 may comprise a portion of the flash memory 221 and may be enabled to store a first stage, stage 1, of software code utilized by the security processor 219. The code stored in the locked flash 223 may be processed by a secure hashing algorithm (SHA), or hash, to be compared to a secure hashing algorithm digest stored in the OTP 217, to verify the validity of the stored code. In another embodiment of the invention, the code stored in the locked flash 223 may be verified utilizing a signature. The unlocked flash 225 may be a portion of the flash memory 221, which may store data that may be protected by a signature.

In operation, in an exemplary embodiment of the invention, the security processor 219 may read the customer mode, or which functions and/or algorithms may be enabled or disabled in the system, such as the set-top box 103 described with respect to FIG. 1B, from the OTP memory 217. If the customer mode indicates a particular function may be disabled, the conditional disable signal 209 may be enabled high, or '1'. A '1' at the S input of the flip-flop 203, may set the output Q of the flip-flop to 1, resulting in at least one of the inputs of the OR gate 205 being enabled to '1', which may generate a '1' for the function disable signal 215 at the output of the OR gate 205. Other logic states may be utilized without departing from the spirit and scope of the invention.

The security of the reprogrammable system, such as the set-top box 103, described with respect to FIG. 1B, may be greatly enhanced by implementing both firmware, such as the code stored in the boot ROM 201 and the flash memory 221, and hardware, such as the associated circuitry comprising the flip-flop 203 and the OR gate 205, as described in this embodiment of the invention. Once a function may be disabled by this technique, it may not be re-enabled until the next power-on reset, such that no additional code downloads may reverse the disable feature. Upon a power-on reset, the boot ROM 201 again may control the start up and configure the appropriate access rights for the given customer mode. In this manner, only code and/or algorithms associated with a specific customer may be enabled by the boot ROM 201 and the OTP memory 217. Functions may also be disabled by the other sources of disable signal 213, which may be generated by the security processor 219, or may be communicated to the security processor from an external source, such as a service provider, for example.

The security processor 219 executing from the boot ROM 201 may be at a higher trust level than when the security processor 219 is executing from downloaded code. The boot ROM firmware may be written by a trusted source (namely the chip vendor), and so may be relied upon to correctly configure the specific hardware which may be appropriate for the given customer mode. Trusted code may thus be defined as code written by a trusted source. Whereas, when the security processor 219 may be running from downloaded code stored in the $2^{nd}$ stage flash 225, the downloaded code may be created by a given customer who may not be explicitly monitored by the chip vendor, and the downloaded code should not be allowed to enable hardware belonging to other organizations, who may be competitors, that may use the same set top box. Thus, combining boot ROM firmware disable functions with hardware disable functions may allow trusted code to set the appropriate access rights for the system, wherein the access rights may not be revoked by subsequent code downloads.

In instances where a hacker, or unauthorized user, may perform a "glitch attack" around the customer mode check performed by the boot ROM 201 and the OTP memory 217, functions may be incorrectly enabled. This may be mitigated by enabling the security processor 219 to re-check the customer mode after boot up and prior to moving to RAM, such as the memory 107, described with respect to FIG. 1B. Such a check may also be done utilizing the trusted code stored in the locked flash 223. Successful completion of this check would be a condition for allowing download of customer written security processor code to be stored in the unlocked flash 225.

Figure 3:
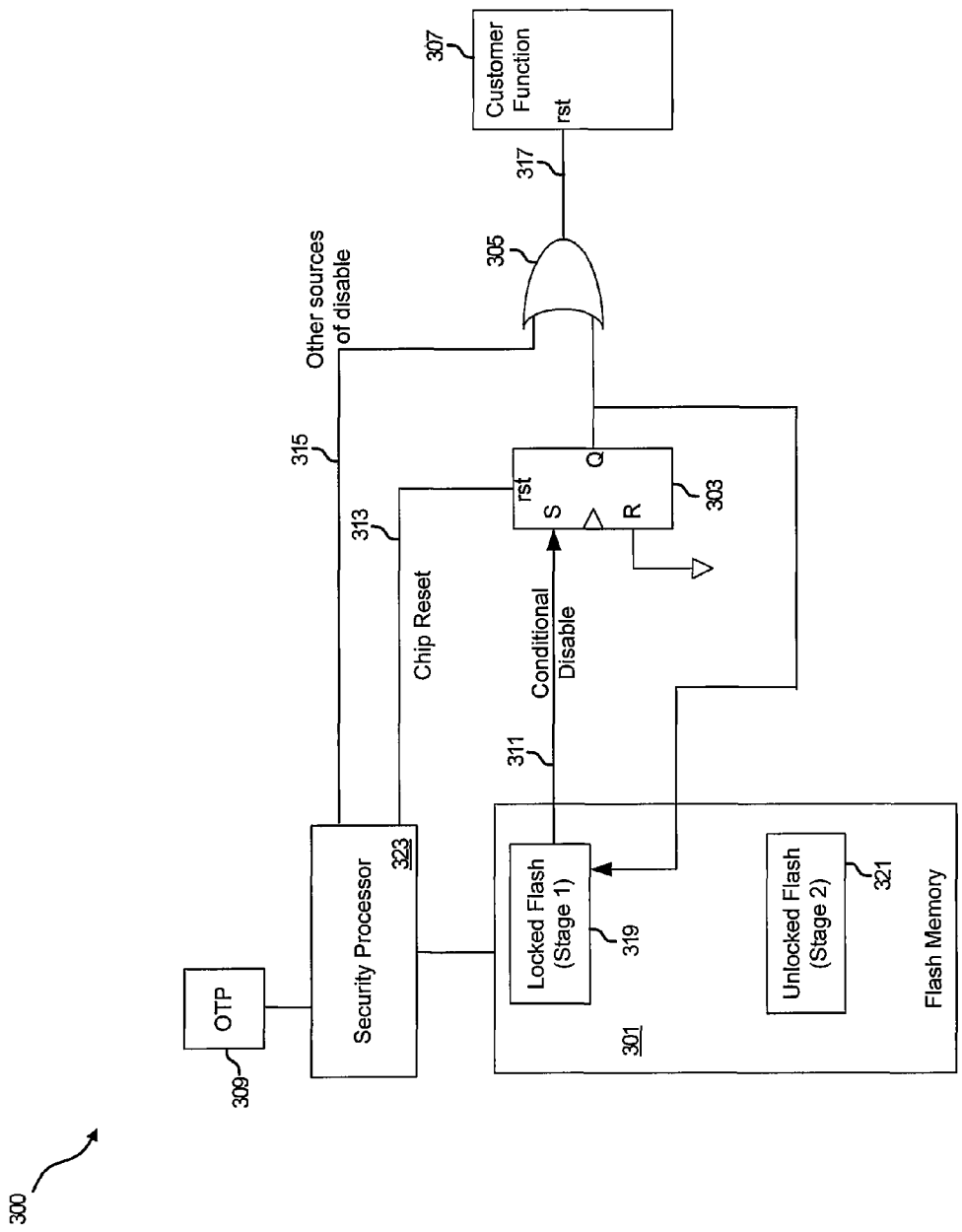
FIG. 3 is a block diagram illustrating an exemplary secure customer mode implementation utilizing locked flash memory in a reprogrammable system, in accordance with an embodiment of the invention.

FIG. 3 is a block diagram illustrating an exemplary secure customer mode implementation utilizing locked flash memory in a reprogrammable system, in accordance with an embodiment of the invention. Referring to FIG. 3, there is shown secure mode customer implementation 300 comprising a flash memory 301, a flip-flop 303, an OR gate 305, a one time programmable (OTP) memory 309, a customer function block 307 and a security processor 323. There is also shown a conditional disable signal 311, a chip reset signal 313, an other sources of disable signal 315, and function disable signal 317.

The flip-flop 303, the OR gate 305, the OTP 309, the security processor 323 and the customer function block 307 may be substantially similar to the flip-flop 203, the OR gate 205, the OTP 217, the security processor 219 and the customer function block 207 described with respect to FIG. 2.

The flash memory 301 may comprise suitable circuitry, logic and/or code that may be enabled to store code that may be utilized by the security processor 323 to control the operation of the set-top box 103, described with respect to FIG. 1B.

The flash memory 301 may comprise a locked flash 319 and an unlocked flash 321. The locked flash 319 may comprise a portion of the flash memory 301 and may be enabled to store a first stage, stage 1, of software code utilized by the security processor 323. The code stored in the locked flash 319 may be processed by a secure hashing algorithm (SHA), or hash, to be compared to a secure hashing algorithm digest stored in the OTP 309, to verify the validity of the stored code. In another embodiment of the invention, the code stored in the locked flash 319 may be verified utilizing a signature. The unlocked flash 321 may be a portion of the flash memory 301, which may store data that may be protected by a signature.

The locked flash 319 may also store data that may comprise boot code, customer-specific algorithms and/or code, for example, for the security processor 323. The boot code stored on the locked flash 319 may comprise operating instructions for the security processor 323 during reboot and/or startup.

In operation, the security processor 323 may read the customer mode, or which functions and/or algorithms may be enabled or disabled in the system, such as the set-top box 103 described with respect to FIG. 1B, from the OTP memory 309. If the customer mode indicates a particular function may be disabled, the conditional disable signal 311 may be enabled high, or '1'. A '1' at the S input of the flip-flop 303, may set the output Q of the flip-flop to 1, resulting in at least one of the inputs of the OR gate 305 being enabled to '1', which may generate a '1' for the function disable signal 317 at the output of the OR gate 305. Other logic states may be utilized without departing from the spirit and scope of the invention.

The security of the reprogrammable system, such as the set-top box 103, described with respect to FIG. 1B, may be greatly enhanced by implementing both firmware, such as the code stored in the flash memory 301, and hardware logic, such as the associated circuitry comprising the flip-flop 303 and the OR gate 305, as described in this embodiment of the invention. Once a function may be disabled by this technique, it may not be re-enabled until the next power-on reset, such that no additional code downloads may reverse the disable feature. Upon a power-on reset, boot code stored in the locked flash 319 again may control the start up and configure the appropriate access rights for the given customer mode. The function would be re-disabled upon restart, since the boot code stored in the locked flash 319 may control the boot up. In this manner, only code and/or algorithms associated with a specific customer may be enabled by the locked flash 319 and the OTP memory 309. Functions may also be disabled by the other sources of disable signal 315, which may be generated by the security processor 323, or may be communicated to the security processor from an external trusted source, such as a service provider, for example.

In instances where a hacker, or unauthorized user, may perform a "glitch attack" around the customer mode check performed by the locked flash 319 and the OTP memory 309, functions may be incorrectly enabled. This may be mitigated by enabling the security processor 323 to re-check the customer mode after boot up and prior to moving to RAM, such as the memory 107, described with respect to FIG. 1B. Such a check may also be done utilizing the trusted code stored in the locked flash 319. Successful completion of the check would be a condition for allowing download of customer written security processor code.

Figure 4:
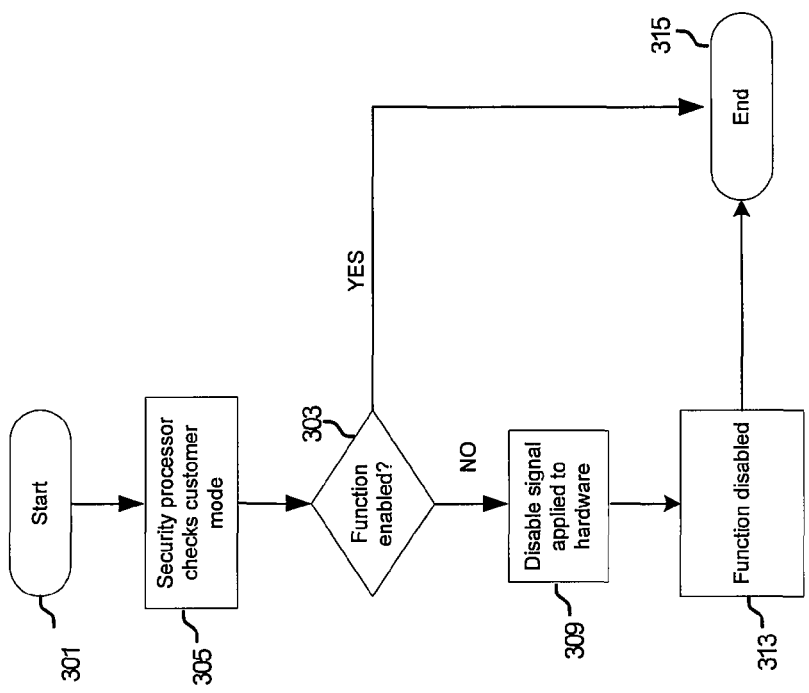
FIG. 4 is a flowchart illustrating exemplary steps for protection of customer secrets in a secure reprogrammable system, in accordance with an embodiment of the invention.

FIG. 4 is a flowchart illustrating exemplary steps for protection of customer secrets in a secure reprogrammable system, in accordance with an embodiment of the invention. After start step 401, in step 403 the security processor 219/323 may check the customer mode from the OTP 217/309 to determine what code and/or algorithms are enabled for a particular set-top box 103. In step 405, if a particular function is enabled, the process may step to end step 411. If a particular function is not enabled, a disable signal generated by firmware, the boot ROM 201 or the locked flash 319, may be communicated to the hardware comprising the flip-flop 203/303 and OR gate 205/305. In step 409, the function may be disabled by the output of the OR gate 205/305.

In an embodiment of the invention, a method, system and machine-readable code are disclosed for controlling, via hardware logic and firmware, access to customer specific functions. The firmware may comprise trusted code, and may comprise boot code, stored in non-volatile memory, which may comprise read only memory 201, or a locked flash memory 319. A customer mode may be checked via the trusted code prior to allowing downloading of code written by a customer to the reprogrammable system 103. Access to customer specific functions may be restricted via commands from a trusted source. The hardware logic may be latched at startup in a disabled mode by the firmware, determined by the customer mode stored in a one time programmable memory 217. The customer mode may be re-checked utilizing the firmware, and may disallow the use of code other than trusted code in the reprogrammable system 103 when the re-checking fails.

Certain embodiments of the invention may comprise a machine-readable storage having stored thereon, a computer program having at least one code section for communicating information within a network, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for software security, in a reprogrammable system that handles a plurality of customer specific functions for a corresponding plurality of customers, the method comprising:
   storing, in memory, as firmware, a plurality of user-specific algorithms;
   controlling, via hardware logic and a particular user-specific algorithm, access to one or more of said plurality of customer specific functions for a particular customer while excluding access to all other customer-specific functions of all other of said plurality of customers once said reprogrammable system is configured for a particular customer, thereby defining a customer mode;
   wherein the excluding access to all other customer-specific functions of all other of said plurality of customers includes latching said hardware logic in a disabled mode by said firmware for said all other customer-specific functions of all other of said plurality of customers, and
   wherein the user-specific algorithm comprises a unique customer-specific key used to control the access to the one or more of said plurality of customer specific functions and a common key used to control access to non-customer specific functions.

2. The method according to claim 1, wherein said firmware comprises trusted code stored in non-volatile memory.

3. The method according to claim 2, comprising checking said customer mode, via said trusted code, prior to allowing downloading of code written by one of said plurality of customers, to said reprogrammable system.

4. The method according to claim 2, wherein said non-volatile memory comprises read only memory.

5. The method according to claim 2, wherein said non-volatile memory comprises a locked flash memory.

6. The method according to claim 2, wherein boot code for said reprogrammable system is stored in said non-volatile memory.

7. The method according to claim 1, comprising restricting said access to one or more of said plurality of customer specific functions via commands from a trusted source.

8. The method according to claim 1, wherein said latching is performed at startup of said reprogrammable system.

9. The method according to claim 1, comprising re-checking said customer mode utilizing said firmware.

10. The method according to claim 9, comprising disallowing use of code other than trusted code in said reprogrammable system when said re-checking fails.

11. The method according to claim 1, wherein said customer mode for said particular customer is stored in a one time programmable memory.

12. A system for software security, the system comprising:
    one or more circuits for use in a reprogrammable system, said one or more circuits handles a plurality of customer specific functions for a corresponding plurality of customers;
    memory configured to store firmware and a plurality of user-specific algorithms; and
    said one or more circuits comprising hardware logic and a particular user-specific algorithm that control access to one or more of said plurality of customer specific functions for a particular customer while excluding access to all other customer-specific functions of all other of said plurality of customers once said reprogrammable system is configured for a particular customer, thereby defining a customer mode,
    wherein the user-specific algorithm comprises a unique customer-specific key used to control the access to the one or more of said plurality of customer specific functions and a common key used to control access to non-customer specific functions, and
    wherein said one or more circuits enables latching said hardware logic in a disabled mode by said firmware for said all other customer-specific function of all other of said plurality of customers.

13. The system according to claim 12, wherein said firmware comprises trusted code stored in non-volatile memory.

14. The system according to claim 13, wherein said one or more circuits enables checking said customer mode, via said trusted code, prior to allowing downloading of code written by one of said plurality of customers, to said reprogrammable system.

15. The system according to claim 13, wherein said non-volatile memory comprises read only memory.

16. The system according to claim 13, wherein said non-volatile memory comprises a locked flash memory.

17. The system according to claim 13, wherein boot code for said reprogrammable system is stored in said non-volatile memory.

18. The system according to claim 12, wherein said one or more circuits enables restricting said access to one or more of said plurality of customer specific functions via commands from a trusted source.

19. The system according to claim 12, wherein said latching is performed at startup of said reprogrammable system.

20. The system according to claim 12, wherein said one or more circuits enables re-checking said customer mode utilizing said firmware.

21. The system according to claim 20, wherein said one or more circuits enables disallowing use of code other than trusted code in said reprogrammable system when said re-checking fails.

22. The system according to claim 12, wherein said customer mode for said particular customer is stored in a one time programmable memory.

23. A non-transitory machine-readable storage having stored thereon, a computer program having at least one code section for software security in a reprogrammable system that handles a plurality of customer specific functions for a corresponding plurality of customers, the at least one code section being executable by a machine for causing the machine to perform steps comprising:
    storing, in memory, as firmware, a plurality of user-specific algorithms;
    controlling, via hardware logic and a particular user-specific algorithm, access to one or more of said plurality of customer specific functions for a particular customer while excluding access to all other customer-specific functions of all other of said plurality of customers once said reprogrammable system is configured for a particular customer, thereby defining a customer mode;

wherein the excluding access to all other customer-specific functions of all other of said plurality of customers includes latching said hardware logic in a disabled mode by said firmware for said all other customer-specific functions of all other of said plurality of customers, and wherein the user-specific algorithm comprises a unique customer-specific key used to control the access to the one or more of said plurality of customer specific functions and a common key used to control access to non-customer specific functions.

24. The non-transitory machine readable storage according to claim 23, wherein said firmware comprises trusted code stored in non volatile memory.

25. The non-transitory machine readable storage according to claim 24, wherein said at least one code section comprises code for checking said customer mode, via said trusted code, prior to allowing downloading of code written by one of said plurality of customers, to said reprogrammable system.

26. The non-transitory machine readable storage according to claim 24, wherein said non-volatile memory comprises read only memory.

27. The non-transitory machine readable storage according to claim 24, wherein said non-volatile memory comprises a locked flash memory.

28. The non-transitory machine readable storage according to claim 23, wherein boot code for said reprogrammable system is stored in said non-volatile memory.

29. The non-transitory machine readable storage according to claim 23, wherein said at least one code section comprises code for restricting said access to one or more of said plurality of customer specific functions via commands from a trusted source.

30. The non-transitory machine readable storage according to claim 23, wherein said at least one code section comprises code for performing said latching at startup of said reprogrammable system.

31. The non-transitory machine readable storage according to claim 23, wherein said at least one code section comprises code for re-checking said customer mode utilizing said firmware.

32. The non-transitory machine readable storage according to claim 31, wherein said at least one code section comprises code for disallowing use of code other than trusted code in said reprogrammable system when said re-checking fails.

33. The non-transitory machine readable storage according to claim 23, wherein said customer mode for said particular customer is stored in a one time programmable memory.

* * * * *